United States Patent
Carrel et al.

(10) Patent No.: US 8,352,734 B2
(45) Date of Patent: Jan. 8, 2013

(54) METHOD FOR UPDATING THE FIRMWARE OF A SECURITY MODULE

(75) Inventors: Xavier Carrel, Le Mont-sur-Lausanne (CH); Olivier Brique, Corseaux (CH); Henri Kudelski, Grandvaux (CH); Nicolas Fisher, Versoix (CH)

(73) Assignee: Nagravision S.A., Cheseaux-sur-Lausanne (CH)

( * ) Notice: Subject to any disclaimer, the term of this patent is extended or adjusted under 35 U.S.C. 154(b) by 1157 days.

(21) Appl. No.: 11/656,468

(22) Filed: Jan. 23, 2007

(65) Prior Publication Data

US 2007/0174617 A1   Jul. 26, 2007

(30) Foreign Application Priority Data

Jan. 24, 2006   (EP) .................................... 06100799

(51) Int. Cl.
*H04L 29/06* (2006.01)
(52) U.S. Cl. ...................................................... 713/164
(58) Field of Classification Search .................. 713/164
See application file for complete search history.

(56) References Cited

U.S. PATENT DOCUMENTS

| | | | | |
|---|---|---|---|---|
| 5,003,591 A | * | 3/1991 | Kauffman et al. | 380/232 |
| 2004/0261126 A1 | * | 12/2004 | Addington et al. | 725/135 |
| 2006/0136898 A1 | * | 6/2006 | Bosscha et al. | 717/168 |

FOREIGN PATENT DOCUMENTS

EP   1607821   12/2005

* cited by examiner

*Primary Examiner* — Jeffrey D Popham
(74) *Attorney, Agent, or Firm* — Harness, Dickey & Pierce, P.L.C.

(57) ABSTRACT

A method for updating the firmware of a security module allowing it to "jump" towards a dedicated separate patch message stream thanks to a trigger messages stream broadcasted in a main stream of management messages. The trigger messages comprise version information allowing establishing whether the security module is up-to-date, and an identifier indicating to the security module the suitable patch stream. If the current version of the firmware of the security module is inferior to the patch version, the security module is directed towards the stream of patch messages designated by the identifier included in the trigger messages. Once the update of the firmware is complete, the security module is again directed towards the main stream. This return can be carried out automatically, namely with a switch message comprising an identifier of the first stream.

7 Claims, 1 Drawing Sheet

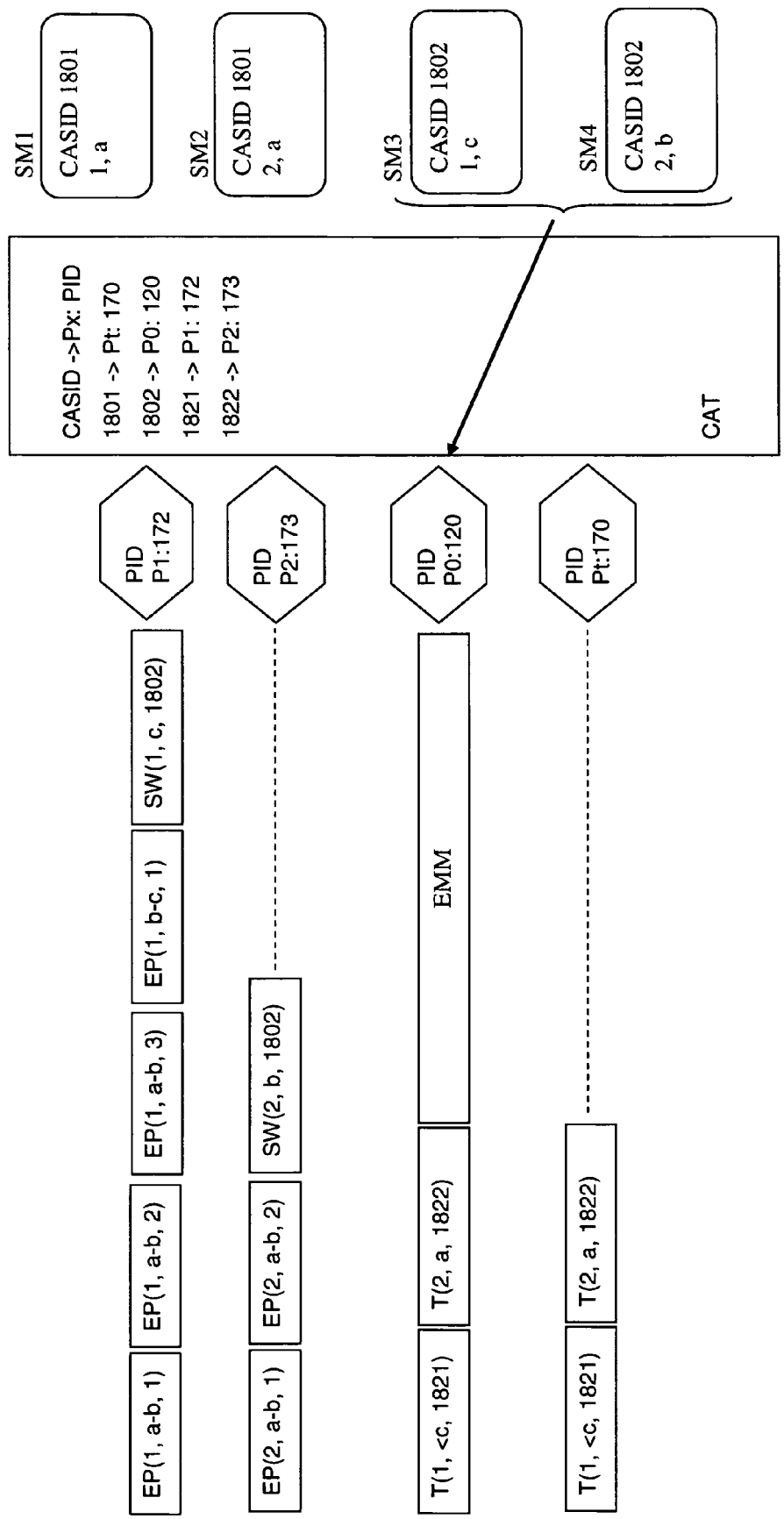

METHOD FOR UPDATING THE FIRMWARE OF A SECURITY MODULE

FIELD OF THE INVENTION

The present invention relates to the field of updating or modifying the firmware of a security module within the scope of Pay-TV. More particularly, it handles on the modification of the software of user units' security modules according to the different types or generations of processors available in these modules.

TECHNICAL BACKGROUND

The role of a security module is to control the access to a stream transporting encrypted digital data made available to users by a broadcasting server. In the particular case of the Pay-TV field, a user unit or decoder allows the access and decryption of the encrypted audio/video data stream broadcasted according to the rights registered in the security module associated to said decoder.

The security module may mainly be provided according to three different forms. One of these is a microprocessor card, a smart card or more generally a protected electronic module that is reputedly tamper-proof. This type of generally removable module is inserted into a suitable reader that connects it to the decoder.

A second known form is that of an integrated circuit case placed, generally irremovably and definitively, inside the box of the decoder. An embodiment is made up of a circuit mounted on a socket or connector as a SIM card (Subscriber Identity Module) in a mobile telephone for example.

In a third form, the security module is arranged inside the case of an integrated circuit having also another function, for example in a decryption module or in the central microprocessor of the decoder.

These security modules provided with communication interfaces receive messages intended on one hand to manage the access rights to the broadcasted stream and on the other hand to update or modify the software or firmware assuring the functioning of the module itself.

These messages are called administration or management messages EMM (Entitlement Management Message).

The updates of the rights in the security modules of the user units are carried out by sending of management messages EMM addressed to the concerned units. According to an example of configuration, the management center receives a request transmitted by the security module and transmits in response an EMM message containing, for example, a key allowing the updating of access rights. The security module transmits a reception confirmation message to the management center.

Concerning the firmware stored in the security module, the modifications, in general in the form of pieces of code (patches), constitute a set of EMM messages transmitted to the module in the transport stream of the digital data or in the stream of the control messages ECM or also in a separate stream.

At present, these patches are limited in size and certain cards (or security modules) that cannot be updated to the most recent version are able to decrypt the stream or access to it. Therefore, a new card or a recycled card accessing the stream for first time is immediately functional even without the updating of its firmware. A possible modification of the latter is carried out progressively with EMM messages broadcasted in the stream during periods of reduced data throughput.

The document US2005/0091699 describes a method and a system of redirection of software downloading in a cable television network. A downloading control message transmitted from a management center to reception terminals (set top boxes) controls the loading and installation of programs by these terminals. The message provides to the terminal all the necessary information for instantaneous acquisition of data such as a program identifier, a transmission channel identifier, a packet identifier PID or an URL address allowing the location of the data to be downloaded. The message also contains the information allowing the terminal to authenticate and install the new data. The latter compose programs intended to control the terminal or to add supplementary functionalities such as a messaging service or a television program guide. The operating system of the terminal as well as the applications using this system can also be updated by this method.

The document EP1607821 describes a secure updating method of software in a security module. When a program block is ready to be broadcasted, the method consists of determining a target area in the memory of the security module. Once the location of this area is known, the content that had been programmed during the personalization of the module can be retrieved thanks to the data stored by the management center. A second block obtained by a reversible mixing operation of this data with the block to be broadcasted is transmitted to the concerned security module. On reception, the content of the target memory is read in order to obtain, by a reverse mixing operation, the initial program block that will be stored in the memory of the security module.

The method and the system of the document US2005/0091699 do not allow the loading or updating of the firmware of the security module but only of the software or applications of the reception terminal. A new version of the software of the terminal can certainly ensure the improved working of a security module but in certain cases, however it becomes necessary to update the firmware of the security module itself.

The drawback of the method of the document EP1607821 resides in the fact that it only allows the loading or updating of security module firmware with successive blocks, which can be tedious when the program and/or the frequency of the updates are large. Certain types of security modules or chip cards require patches having a relatively large size and a large number of EMM messages to transmit them entirely. When these messages are transmitted in the digital data stream also comprising the encrypted audio/video data of content and the control messages, the update can take several hours until the reception of the complete patch.

In case the patch should be essential for decrypting the data of the stream, a new card inserted into the decoder leads, for example, to a prolonged absence of the image on the television screen; such an interruption being unacceptable.

SUMMARY OF THE INVENTION

The aim of the present invention is to avoid the aforementioned drawbacks and to ensure the fast loading of a firmware patch in a card with a large number of EMM messages. Therefore, the frequency of the updates can be increased with insignificant negative effects on the reception of the broadcasted content.

This aim is achieved by a method for updating the firmware of a security module associated to a user unit for processing digital data broadcasted in a transport stream, said unit being connected to a conditional access system transmitting to the security module, in said transport stream, a first stream of management messages, said method comprising the steps of:

broadcasting at least a second stream comprising the patch messages suitable for updating the firmware of the security module, said second stream being identified by an identifier associated to a predetermined type of security module, adding to the first stream of management messages, trigger messages comprising version information allowing establishing whether said security module is up-to-date, and an identifier indicating to said security module the suitable patch stream, if the current version of the firmware of the security module is inferior to the patch version, directing the security module towards the patch message stream designated by the identifier included in the trigger message, updating the firmware of the concerned security module with the patch message stream, directing the security module towards the first management message stream when the update of the firmware is completed.

The method allows the security module to "jump" towards a dedicated separate patch message stream thanks to the trigger messages stream broadcasted in a main stream of management messages. Once the update of the firmware is complete, the security module is again directed towards the main stream. This return can be carried out automatically, namely with a switch message comprising an identifier of the first stream.

According to an embodiment, when the access to digital data of a broadcasted program is no longer possible due to obsolete firmware, the security module can "jump" automatically towards a separate stream of patch messages. It can also "jump" periodically towards this stream for maintaining the constant updating of its firmware. This embodiment is applied either, when the security module does not transmit the data of its firmware version to the conditional access system, or when the security module ignores its version allowing it to interpret the trigger messages.

The security module then receives in a minimum time a set of messages forming the entire patch and corresponding to its firmware. According to the prior art, the patch messages are broadcasted in the transport stream in longer periods and mixed with other management messages. This mixed transmission requires numerous verifications by the security module in order to determine if a received message concerns its firmware or not; these verifications increase considerably the updating time.

For a preferred implementation of the method, at least three types of management messages can be used, namely:

a) Trigger messages (trigger EMM) comprise a code of the type of security module with a final version reference of the firmware or the version to be reached if the current version is inferior, as well as an identifier indicating the stream of patch messages.

b) Numerous chained messages (patch EMM) forming the patch allowing the updating of the firmware of the security module from an initial version towards a new version. Each message contains the code of the type of security module, the initial and final version reference, an index identifying the position of a message in the chain and the data of the updating patch. According to one embodiment, the messages contain a specific key in place of the data concerning the type and version.

c) Switch messages (switch EMM), transmitted at the end of a patch message chain, allow the security module to receive the first message stream when the update is complete. They are used to redirect the security module towards a common stream (the main message stream) to which all the security modules are connected during their normal functioning.

According to one embodiment, the security module is associated to a conditional access system which transmits the stream of management messages serving on one hand to control the access rights to data broadcasted in the transport stream and on the other hand to manage the updating of the firmware. Therefore, each security module includes an identifier of the appropriate conditional access system. In order to allow the directing of the security module towards the suitable message stream, a correspondence table is defined that associates the conditional access system identifiers to identifiers of different streams used in the updating process.

The trigger and switch messages do not thus contain an identifier of a stream, but rather the identifier of the conditional access system transmitting this stream. The table therefore converts the conditional access system identifiers into identifiers that indicate the stream towards which the security module has to be directed.

One advantage of this type of a table is that the allocations of a stream with a given identifier to an access control system can be modified at any moment according to the available updates and to the used types of security modules.

BRIEF DESCRIPTION OF THE DRAWING

The invention will be better understood thanks to the following detailed description that refers to the annexed drawing given as non-limitative example.

FIG. 1 shows an overview of the mechanism allowing a security module "to jump" towards a dedicated patch message stream when the version of its firmware becomes obsolete.

DETAILED DESCRIPTION OF A PREFERRED MODE OF CARRYING OUT THE INVENTION

FIG. 1 shows a simplified diagram of the updating method for security modules (SM1, SM2, SM3, SM4) with trigger messages (T) and patch messages (EP) using a table (CAT). The latter associates the identifiers (CASID) of access control systems with identifiers (PID) of the stream (P0, P1, P2, Pt) of management messages (EMM).

The example in FIG. 1 shows a stream (P1) of patch messages identified by the identifier (PID) with reference 172 that allow the updating of the security modules (SM3) of type 1 from the firmware version a towards version b, then from version b towards the final version c. The message with reference EP(1, a-b, 1) represents the first message of a chain of three patch messages valid for the security modules of type 1 containing the data necessary to update version a towards version b. The first parameter (1) is related to the type or the generation of the security module processor, the second parameter (a-b) indicates that the update is carried out from the initial version a towards version b and finally the third parameter is an index indicating the position of the message in the chain, here (1) for the first message. The second message with reference EP(1, a-b, 2) only differs from the first except with respect to its index (2) and its program data contents which constitute the continuation of those of the first message and so on for all the messages of one chain.

For the passage of version b to the final version c, the example only shows one message EP(1, b-c, 1). The last message of the stream (P1) with reference SW(1, c, 1802) is a switch message of an identifier of the conditional access system. This message allows the redirection towards the access control system of identifier (CASID) 1802 of the security modules of type 1 which updating towards version c has been successful. For this operation, the correspondence table (CAT) indicates that the stream transmitted by the access control system 1802 corresponds to the stream (P0) which identifier (PID) is 120, that is to say a stream of common or main management messages (EMM) transmitted to all the security modules. In FIG. 1, the arrow and the bracket show that the security modules (SM3) and (SM4) of different types are connected to the main stream (P0) of (PID) 120.

Another stream (P2) of patch messages identified by the identifier (PID) 173 relates to security modules (SM4) of type 2. The chain here includes two updating messages EP(2, a-b, 1) and EP(2, a-b, 2) that allow the passage of version a towards version b of the firmware. The switch message SW(2, b, 1802) redirects the security modules of type 2 towards the main stream (P0) of identifier (PID) 120 as that of stream (P1) mentioned previously relating to the security modules of type 1.

In order to start the updating of the security modules (SM3, SM4) respectively of type 1 and 2 connected to the access control system of identifier (CASID) 1802, trigger messages T(1, <c, 1821) and T(2, a, 1822) are transmitted in the main stream (P0) of identifier (PID) 120. The first trigger message T(1, <c, 1821) instructs all the security modules of type 1 (first parameter) of the version inferior to c (second parameter) to connect to the access control system of identifier (CASID) 1821 (third parameter).

This connection is established thanks to the table (CAT) that indicates that the system of identifier (CASID) 1821 corresponds to the stream (P1) of patch messages which identifier (PID) is 172. The updating towards version c will thus be carried out for modules (SM3) of type 1 of version a and version b as described above. A module of version b will not be affected by the three patch messages relating to the passage of version a towards b, but only by the message EP(1, b-c, 1) which will update the module of version b towards version c.

The second trigger message T(2, a, 1822) is responsible for directing the security modules (SM4) of type 2 and of version a towards the access control system of identifier (CASID) 1822. The table indicates that this system (1822) transmits the stream (P2) of (PID) 173 allowing the updating of the security modules (SM4) of type 2 of version a towards version b.

A new security module (SM1, SM2) inserted for the first time in a user unit, such as for example a Pay-TV decoder, is connected to a particular access control system essentially transmitting trigger messages (T).

According to FIG. 1, the security modules (SM1) and (SM2) respectively of type 1 and 2 with firmware of an initial version are intended to be connected to the access control system of identifier (CASID) 1801. In the table (CAT) the identifier (CASID) 1801 is associated to a stream (Pt) identified by the identifier (PID) 170 comprising the trigger messages T(1, <c, 1821) and T(2, a, 1822). These messages allow the triggering respectively of the security modules of type 1 with a version inferior to c towards the access control system of identifier (CASID) 1821 and the security modules of type 2 with version a towards the access control system of identifier (CASID) 1822. These two systems 1821 and 1822 transmit respectively the stream (P1) which identifier (PID) is 172 and the stream (P2) of (PID) 173 according to the table (CAT). These streams (P1, P2) then carry out the updating of these new security modules (SM1, SM2) in the same way as for on-line security modules (SM3, SM4) as described above. At the end of the update, the respective switch messages SW(1, c, 1802), SW(2, B, 1802) redirect these modules towards the main stream (P0) transmitted by the access control system of identifier (CASID) 1802 that is to say, still according to the table (CAT), towards the main stream (P0) identified by the identifier (PID) 120.

In case of error, unconditional switch messages (SW), that is to say without the final version parameter, can be transmitted in an updating stream to force the security module to return towards the main stream (P0) regardless of the version of its firmware.

When the number of types or generations of security modules becomes larger, the number of identifiers (CASID) corresponding to access control systems (CAS) transmitting the update message stream increases in the same ratio. According to one embodiment, in order to optimize the method, the patch messages (EP) can be grouped in one stream with a given identifier (PID) according to a family of types of security module. Such a family can be defined according to a type of processor, technology or software implemented in the security module. A stream of patch messages also includes several message chains intended for several types of a same modules family. The first parameter can for example designate a family and a type instead of only the type of module as in the example in FIG. 1. The number of update streams and accordingly access systems is thus reduced according to the number of module types that can be grouped in families.

According to another embodiment, the patch messages (EP) can be broadcasted in a stream to which the security module is connected by default. When the update is completed or when the module is already up-to-date, it switches automatically towards the main stream broadcasting the EMM management messages. Therefore, the broadcasting of the trigger messages in the main stream becomes superfluous. Only the switch messages can be broadcasted in the main stream to direct the security module towards the patch stream when an update of its firmware is available.

The invention claimed is:

1. A method for updating firmware of a security module associated to a user unit for processing digital data broadcasted in a transport stream, said unit being connected to a conditional access system transmitting, in said transport stream, to the security module a first stream of entitlement management messages that are associated with rights management in the security module, said security module including an identifier of the conditional access system transmitting the first stream, said method comprising the steps of:
   broadcasting at least a second stream of entitlement management messages configured as patch messages forming a chain, each patch message comprising at least a type code of the security module to be updated, an initial and a final version reference, an index identifying the position of the patch message in the chain and program data configured to update the firmware of the security module, and, following the chain of the patch messages, an entitlement management message configured as a switch message comprising at least the type code of the security module, a reference of a final version reached after updating and the identifier of the conditional access system transmitting the first stream,
   adding to the first stream of entitlement management messages, an entitlement management message configured as a trigger message comprising at least the type code of the security module to update, a version information indicating whether said security module is up-to-date, and an identifier indicating to said security module the conditional access system transmitting a second stream transporting suitable patch messages corresponding to the security module defined by the type code, wherein a correspondence table is defined that associates the identifier of the conditional access system to identifiers of the first and second streams transmitted by said conditional access system, if the current version reference of the firmware of the security module is inferior to a final version reference, directing the security module towards the conditional access system transmitting the second stream transporting patch messages designated by the identifier included in the trigger message and corresponding to the type of security module defined by the type code, updating the firmware of the concerned security module related to the stream of patch messages with the chain of patch messages from the second stream, directing the security module with the switch message following the chain of patch messages towards the access control system transmitting the first stream being determined by the correspondence table with the identifier of the conditional access system.

2. The method according to claim 1, wherein a new security module associated for the first time to a user unit is connected to a particular conditional access system transmitting a stream of trigger messages comprising at least one message allowing directing towards a conditional access system transmitting the second stream of patch messages adapted to the type and to the version of the firmware of said security module.

3. The method according to claim 1, wherein the patch messages are transmitted grouped in one stream with a given identifier according to a family of types of security module.

4. The method according to claim 1, wherein the patch messages, the trigger messages and the switch messages comprise at least one code designating the family and a type of security module.

5. Conditional access system to which is connected at least one user unit for processing digital data broadcasted in a transport stream, said unit being associated to a security module, the conditional access system being configured to transmit, in the transport stream, to the security module, a first stream of entitlement management messages that are associated with rights management in the security module, said security module including an identifier of the conditional access system transmitting the first stream, the conditional access system comprising hardware configured to update firmware of the security module by performing the steps of:

broadcasting at least a second stream of entitlement management messages configured as patch messages forming a chain, each patch message comprising at least a type code of the security module to be updated, an initial and a final version reference, an index identifying the position of the patch message in the chain and program data suitable for updating the firmware of the security module, and, following the chain of the patch messages, an entitlement management message configured as a switch message comprising at least the type code of the security module, a reference of a final version reached after updating and the identifier of the conditional access system transmitting the first stream, adding to the first stream of entitlement management messages, an entitlement management message configured as a trigger message comprising at least the type code of the security module to update, a version information indicating whether said security module is up-to-date, and an identifier indicating to said security module the conditional access system transmitting a second stream transporting the suitable patch messages corresponding to the security module defined by the type code, wherein a correspondence table is defined that associates the identifier of the conditional access system to identifiers of the first and second streams transmitted by said conditional access system, if the current version reference of the firmware of the security module is inferior to a final version reference, directing the security module towards the conditional access system transmitting the second stream transporting patch messages designated by the identifier included in the trigger message and corresponding to the type of security module defined by the type code, updating the firmware of the concerned security module with the chain of patch messages from the second stream, directing the security module with the switch message following the chain of patch messages towards the access control system transmitting the first stream of entitlement management messages, the identifier of said first stream being determined by the correspondence table with the identifier of the conditional access system.

6. The conditional access system according to claim 5, wherein the patch messages are transmitted grouped in one stream with a given identifier according to a family of types of security module.

7. The conditional access according to claim 5, wherein the patch messages, the trigger messages and the switch messages comprise at least one code designating a family and type of security module.

* * * * *

UNITED STATES PATENT AND TRADEMARK OFFICE
CERTIFICATE OF CORRECTION

| | | |
|---|---|---|
| PATENT NO. | : 8,352,734 B2 | Page 1 of 1 |
| APPLICATION NO. | : 11/656468 | |
| DATED | : January 8, 2013 | |
| INVENTOR(S) | : Carrel et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1290 days.

Signed and Sealed this
Eleventh Day of November, 2014

Michelle K. Lee
*Deputy Director of the United States Patent and Trademark Office*